United States Patent
Hegde

(10) Patent No.: US 10,019,074 B2
(45) Date of Patent: Jul. 10, 2018

(54) TOUCHLESS INPUT

(71) Applicant: Microsoft Technology Licensing, LLC, Redmond, WA (US)

(72) Inventor: Guru Hegde, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/073,895

(22) Filed: Mar. 18, 2016

(65) Prior Publication Data
US 2016/0202770 A1    Jul. 14, 2016

Related U.S. Application Data

(63) Continuation of application No. 13/651,187, filed on Oct. 12, 2012, now Pat. No. 9,310,895.

(51) Int. Cl.
*G06F 3/033*    (2013.01)
*G06F 3/00*    (2006.01)
(Continued)

(52) U.S. Cl.
CPC ............. *G06F 3/033* (2013.01); *G06F 3/005* (2013.01); *G06F 3/017* (2013.01); *G06F 3/0304* (2013.01);
(Continued)

(58) Field of Classification Search
CPC .......... G06F 3/033; G06F 3/005; G06F 3/017; G06F 3/0304; G06F 3/0428; G06K 9/00335
(Continued)

(56) References Cited

U.S. PATENT DOCUMENTS 6,658,136 B1    12/2003    Brumitt
8,581,864 B2    11/2013    Miyazawa et al.
(Continued)

FOREIGN PATENT DOCUMENTS

CA    2262300 A1    8/1999
CN    101689244 A    3/2010
(Continued)

OTHER PUBLICATIONS

Tsang, W. et al., "A Finger-Tracking Virtual Mouse Realized in an Embedded System", In Proceedings of 2005 International Symposium on Intelligent Signal Processing and Communication Systems, Dec. 13, 2005, Hong Kong, 4 pages.
(Continued)

*Primary Examiner* — Dmitriy Bolotin
(74) *Attorney, Agent, or Firm* — Alleman Hall Creasman & Tuttle LLP

(57) ABSTRACT

A series of depth maps image a scene including a human subject. Each depth map includes a plurality of pixels, where each of the plurality of pixels defines a depth of a surface imaged by that pixel. The human subject is modeled with a virtual skeleton including a virtual hand joint. A position of the virtual hand joint is mapped to a corresponding portion of one or more depth maps in the series of depth maps. One or more fingers are modeled from depth map information of the corresponding portion of the one or more depth maps. A finger gesture is interpreted from the modeled fingers.

20 Claims, 12 Drawing Sheets

(51) Int. Cl.
  *G06F 3/042* (2006.01)
  *G06F 3/01* (2006.01)
  *G06F 3/03* (2006.01)
  *G06K 9/00* (2006.01)

(52) U.S. Cl.
  CPC ....... *G06F 3/0428* (2013.01); *G06K 9/00335* (2013.01)

(58) Field of Classification Search
  USPC .......................................................... 345/157
  See application file for complete search history.

(56) References Cited

U.S. PATENT DOCUMENTS

| | | | |
|---|---|---|---|
| 8,633,909 B2 | 1/2014 | Miyazawa et al. | |
| 8,760,418 B2 | 6/2014 | Miyazawa et al. | |
| 9,213,890 B2* | 12/2015 | Huang | G06F 3/017 |
| 9,330,307 B2* | 5/2016 | Litvak | G06K 9/00382 |
| 2003/0132913 A1 | 7/2003 | Issinski | |
| 2008/0030460 A1 | 2/2008 | Hildreth et al. | |
| 2008/0100572 A1 | 5/2008 | Boillot | |
| 2008/0278450 A1 | 11/2008 | Lashina | |
| 2009/0160767 A1 | 6/2009 | Sugaya et al. | |
| 2009/0172606 A1* | 7/2009 | Dunn | G06F 3/017 715/863 |
| 2009/0183125 A1 | 7/2009 | Magal et al. | |
| 2009/0237372 A1 | 9/2009 | Kim et al. | |
| 2010/0005427 A1 | 1/2010 | Zhang et al. | |
| 2010/0026723 A1 | 2/2010 | Nishihara et al. | |
| 2010/0095206 A1* | 4/2010 | Kim | G06F 3/017 715/702 |
| 2010/0107099 A1 | 4/2010 | Frazier et al. | |
| 2011/0249099 A1 | 10/2011 | Vandewalle et al. | |
| 2011/0291926 A1 | 12/2011 | Gokturk et al. | |
| 2012/0038496 A1* | 2/2012 | Edwards | G06F 3/017 341/34 |
| 2012/0051588 A1 | 3/2012 | McEldowney | |
| 2012/0068917 A1* | 3/2012 | Huang | G06F 3/017 345/156 |
| 2012/0069168 A1* | 3/2012 | Huang | G06F 3/017 348/77 |
| 2012/0113241 A1 | 5/2012 | Sundaresan et al. | |
| 2012/0139838 A1 | 6/2012 | Lee et al. | |
| 2012/0157203 A1* | 6/2012 | Latta | G06F 3/005 463/32 |
| 2012/0235903 A1 | 9/2012 | Im | |
| 2012/0290966 A1* | 11/2012 | Chae | G09G 5/14 715/778 |
| 2012/0293402 A1 | 11/2012 | Harrison et al. | |
| 2012/0319945 A1 | 12/2012 | McCarthy et al. | |
| 2012/0326995 A1 | 12/2012 | Zhang et al. | |
| 2012/0327125 A1 | 12/2012 | Kutliroff et al. | |
| 2013/0010071 A1* | 1/2013 | Valik | G06F 3/0304 348/46 |
| 2013/0050425 A1 | 2/2013 | Im et al. | |
| 2013/0069876 A1 | 3/2013 | Cheng | |
| 2013/0088462 A1 | 4/2013 | So et al. | |
| 2013/0103446 A1 | 4/2013 | Bragdon et al. | |
| 2013/0106692 A1 | 5/2013 | Maizels et al. | |
| 2013/0120250 A1 | 5/2013 | Lin et al. | |
| 2013/0155031 A1* | 6/2013 | Dahl | G06F 3/0412 345/177 |
| 2013/0283213 A1 | 10/2013 | Guendelman et al. | |
| 2013/0285894 A1* | 10/2013 | Marti | G06F 3/005 345/156 |
| 2013/0295539 A1* | 11/2013 | Wilson | H04N 9/3147 434/247 |
| 2014/0022171 A1 | 1/2014 | Yanai | |
| 2014/0028548 A1 | 1/2014 | Bychkov et al. | |
| 2014/0085197 A1* | 3/2014 | Patel | G06F 3/033 345/157 |
| 2015/0186716 A1* | 7/2015 | Litvak | G06K 9/00382 382/154 |
| 2015/0248582 A1* | 9/2015 | Ryu | G06K 9/00355 382/103 |

FOREIGN PATENT DOCUMENTS

| | | |
|---|---|---|
| CN | 102194128 A | 9/2011 |
| CN | 102707876 A | 10/2012 |
| EA | 11145 B1 | 2/2009 |
| JP | 2007141018 A | 6/2007 |
| JP | 2011187086 A | 9/2011 |
| JP | 2012048568 A | 3/2012 |
| JP | 2012137989 A | 7/2012 |
| RU | 2420784 C2 | 6/2011 |
| RU | 110845 U1 | 11/2011 |
| RU | 2455676 C2 | 7/2012 |
| WO | 03073254 A2 | 9/2003 |
| WO | 2012133962 A1 | 10/2012 |

OTHER PUBLICATIONS

Gallo, O. et al., "A Camera-Based Pointing Interface for Mobile Devices", In Proceedings of 15th IEEE International Conference on Image Processing (ICIP '08), Oct. 12, 2008, San Diego, 4 pages.

Sigurdsson, G. et al., "Finger Tracking for Rapid Cropping Applications", Stanford University—CS223B Winter Quarter 2008, Retrieved Jun. 28, 2012, 6 pages.

Ujjainkar, S. et al., "Finger Tracking Virtual Mouse", BLB-International Journal of Science & Technology, vol. 1, No. 2, Available as early as Jan. 1, 2010, Retrieved Jun. 28, 2012, 6 pages.

Singh, T., "FingerMouse", Columbia University, https://sites.google.com/site/tarandeep/fingermouse, Available as early as Dec. 28, 2009, Retrieved Jun. 28, 2012, 2 pages.

Arndt, R., "Leap Motion Launches 3D Gesture Sensor", Popular Mechanics, http://www.popularmechanics.com/technology/gadgets/a9211/leap-motion-launches-3d-gesture-sensor-15720350/, Jul. 22, 2013, Retrieved on Mar. 15, 2016, 7 pages.

ISA European Patent Office, International Search Report and Written Opinion issued in Application No. PCT/US2013/064427, Dec. 13, 2013, WIPO, 10 pages.

"Hillcrest Labs Brings Motion, Gesture and Cursor Control to Skyworth Smart TVs", Sensors Online, http://www.sensorsmag.com/sensors-products/news/hillcrest-labs-brings-motion-gesture-and-cursor-control-15869, Oct. 6, 2014, Retrieved on Mar. 15, 2016, 2 pages.

United States Patent and Trademark Office, Office Action Restriction Requirement issued in U.S. Appl. No. 13/651,187, dated Mar. 12, 2015, 6 pages.

United States Patent and Trademark Office, Non-final Office Action issued in U.S. Appl. No. 13/651,187, dated Jun. 4, 2015, 10 pages.

United States Patent and Trademark Office, Notice of Allowance and Fee(s) Due issued in U.S. Appl. No. 13/651,187, dated Dec. 14, 2015, 6 pages.

European Patent Office, Office Action Issued in Application No. 13784066.6, dated Jan. 24, 2017, Netherlands, 3 Pages.

"Notice of Allowance Issued in Russian Patent Application No. 2015113441", dated Oct. 3, 2017, 17 Pages.

"Office Action Issued in Japanese Patent Application No. 2015-536907", dated Aug. 8, 2017, 7 Pages.

Cheng, et al., "ProphetCursor: Large-screen Pointing Technique Using Cursor Movement Assisted by User's Face Orientation", In Human Interface Symposium, 2011, pp. 1087-1092.

* cited by examiner

TOUCHLESS INPUT

CROSS REFERENCE TO RELATED APPLICATIONS

This application is a continuation of U.S. application Ser. No. 13/651,187, filed Oct. 12, 2012 and entitled "TOUCHLESS INPUT," the entirety of which is hereby incorporated by reference for all purposes.

BACKGROUND

Finger-based, touch-input technologies allow a user to directly interact with user interface objects displayed by a touch screen. However, effectively implementing such touch-input technologies presents several challenges. For instance, a finger may visually occlude aspects of the user interface. As another example, the finger pad is a relatively large surface, and it may be difficult to resolve this surface to a single point.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A series of depth maps image a scene including a human subject. Each depth map includes a plurality of pixels, where each of the plurality of pixels defines a depth of a surface imaged by that pixel. The human subject is modeled with a virtual skeleton including a virtual hand joint. A position of the virtual hand joint is mapped to a corresponding portion of one or more depth maps in the series of depth maps. One or more fingers are modeled from depth map information of the corresponding portion of the one or more depth maps. A finger gesture is interpreted from the modeled fingers.

DETAILED DESCRIPTION

The present disclosure is directed to visually detecting touchless input. As described in more detail below, a tracking system including a depth camera and/or other source is used to receive one or more depth maps imaging a scene including one or more human subjects. Pixels in the one or more depth maps are analyzed to identify nonstatic pixels having a shallowest depth. The position of the nonstatic pixel(s) is then mapped to a cursor position. In this way, the position of a pointed finger can be used to control the position of a cursor on a display device. Touchless input may also be received and interpreted to control cursor operations and multitouch gestures.

Figure 1A:
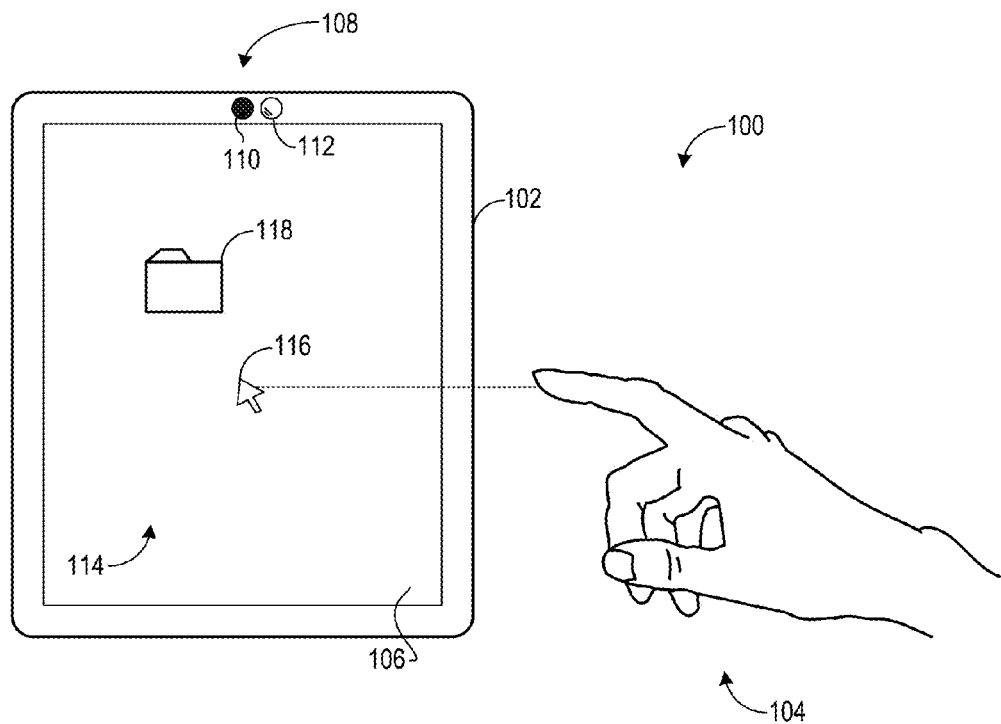
FIGS. 1A and 1B show an example touchless input system imaging a portion of a human subject in accordance with an embodiment of the present disclosure.
Figure 1B:
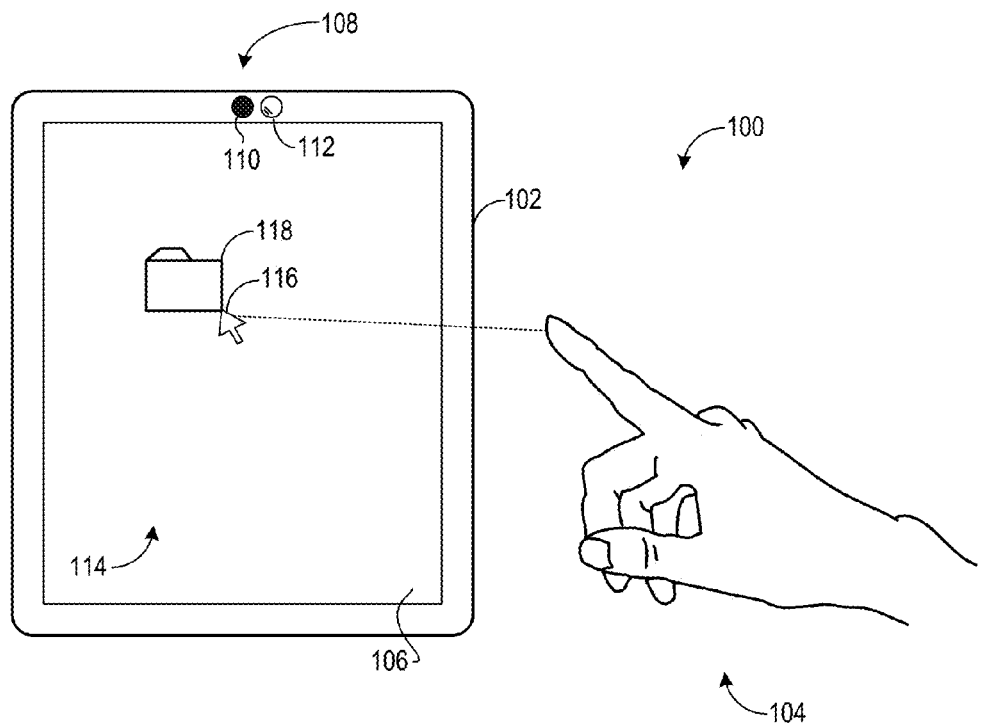

FIGS. 1A and 1B show a nonlimiting example of a touchless input system 100. In particular, FIGS. 1A and 1B show a computing device 102 which may be used to receive touchless input from a user 104. As used herein, "touchless input" is input (e.g., finger pointing) that does not require physically contacting the screen.

Computing device 102 includes an integrated display screen 106, which may be used to present visuals corresponding to the computing functionality offered by the computing device. In other embodiments, a display screen may be a peripheral to the computing device. The computing device may be variously configured to provide virtually any computing functionality without departing from the scope of this disclosure. Furthermore, while computing device 102 is illustrated in the form of a tablet computing device, it should be understood that touchless input may be implemented on virtually any type of computing device, regardless of form.

In some embodiments, touchless input may be received by a tracking system 108. In the illustrated example, tracking system 108 includes a depth camera 110 and a visible light camera 112. Tracking system 108 is shown as being housed within computing device 102, although it may be provided externally as a peripheral device in other embodiments. Tracking system 108 may be used to visually monitor and/or track user 104.

A touchless input system may be used to recognize, analyze, and/or track one or more human users (e.g., user 104) and/or physical objects (e.g., input stylus). FIGS. 1A and 1B show a scenario in which tracking system 108 tracks a hand of user 104 so that movements made by the hand may be interpreted by computing device 102. In particular, the movements of user 104 are interpreted as controls that can be used to affect computing device 102.

The example scenario illustrated in FIGS. 1A and 1B shows user 104 navigating a graphical user interface (GUI 114) which is displayed on display screen 106. Specifically, FIG. 1A shows computing device 102 tracking a position of user 104 in physical space via tracking system 108. Computing device 102 maps a physical-space position of the finger to a position of a cursor 116 in the GUI. FIG. 1B shows that user 104 may move cursor 116 towards a folder 118 by moving the finger, as computing device 102 continually tracks the finger position.

Other movements made by user 104 may be interpreted as other controls. As non-limiting examples, user 104 may carry out a plurality of cursor operations, including click and drag operations. Further, user 104 may carry out other operations not related to a cursor, including multitouch gestures such as zooming and panning. While GUI 114 is provided as an example, it is to be understood that virtually any GUI and/or other aspect of a computing device may be controlled with the touchless input described herein.

Objects other than a human may be modeled and/or tracked. Such objects may be modeled and tracked independently of human subjects. For example, the motion of a user holding a stylus and/or the motion of the stylus itself may be tracked.

Figure 2:
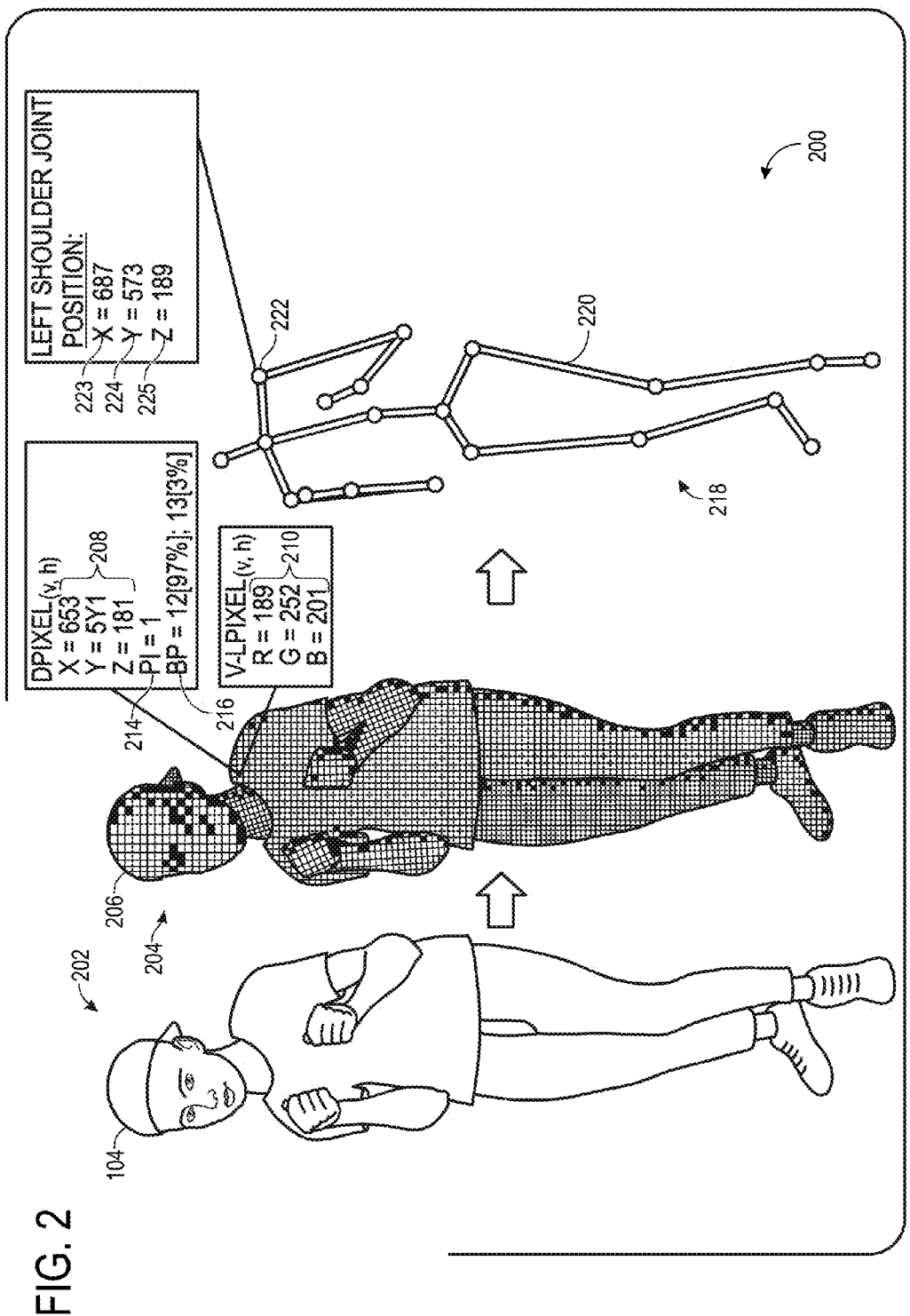
FIG. 2 schematically shows a nonlimiting example of a skeletal tracking pipeline in accordance with an embodiment of the present disclosure.

FIG. 2 graphically shows a simplified tracking pipeline 200 with which a computing device may receive touchless input. For simplicity of explanation, pipeline 200 is described with reference to touchless input system 100 of FIGS. 1A and 1B. However, pipeline 200 may be implemented on any suitable computing device without departing from the scope of this disclosure. For example, pipeline 200 may be implemented on computing device 1200 of FIG. 12. Furthermore, methods or pipelines for receiving touchless input which differ from pipeline 200 may be used without departing from the scope of this disclosure.

At 202, FIG. 2 shows user 104 from the perspective of tracking system 108. A tracking system, such as tracking system 108, may include one or more sensors that are configured to observe a human subject, such as user 104.

At 204, FIG. 2 shows a schematic representation 206 of the observation data collected by a tracking system, such as tracking system 108. The types of observation data collected will vary depending on the number and types of sensors included in the tracking system. In the illustrated example, the tracking system includes a depth camera and a visible light (e.g., color) camera.

A depth camera may determine, for each pixel of the depth camera, the depth of a surface in the observed scene relative to the depth camera. FIG. 2 schematically shows the three-dimensional x/y/z coordinates 208 observed for a DPixel[v,h] of a depth camera of computing device 102. Similar three-dimensional x/y/z coordinates may be recorded for every pixel of the depth camera. The three-dimensional x/y/z coordinates for all of the pixels collectively constitute a depth map. The three-dimensional x/y/z coordinates may be determined in any suitable manner without departing from the scope of this disclosure. Example depth finding technologies are discussed in more detail with reference to FIG. 12.

When included, a visible-light camera may determine, for each pixel of the visible-light camera, the relative light intensity of a surface in the observed scene for one or more light channels (e.g., red, green, blue, grayscale, etc.). FIG. 2 schematically shows the red/green/blue color values 210 observed for a V-LPixel[v,h] of a visible-light camera of tracking system 108. Similar red/green/blue color values may be recorded for every pixel of the visible-light camera. The red/green/blue color values for all of the pixels collectively constitute a digital color image. The red/green/blue color values may be determined in any suitable manner without departing from the scope of this disclosure. Example color imaging technologies are discussed in more detail with reference to FIG. 12.

The depth camera and visible-light camera may have the same resolutions, although this is not required. Whether the cameras have the same or different resolutions, the pixels of the visible-light camera may be registered to the pixels of the depth camera. In this way, both color and depth information may be determined for each portion of an observed scene by considering the registered pixels from the visible light camera and the depth camera (e.g., V-LPixel[v,h] and DPixel [v,h]).

The collected data may take the form of virtually any suitable data structure(s), including but not limited to one or more matrices that include a three-dimensional x/y/z coordinate for every pixel imaged by the depth camera and/or red/green/blue color values for every pixel imaged by the visible-light camera. While FIG. 2 depicts a single frame, it is to be understood that a human subject may be continuously observed and modeled (e.g., at 30 frames per second). Accordingly, data may be collected for each such observed frame. The collected data may be made available via one or more Application Programming Interfaces (APIs) and/or further analyzed as described below.

A tracking system and/or cooperating computing device optionally may analyze the depth map to distinguish human subjects and/or other targets that are to be tracked from non-target elements in the observed depth map. Each pixel of the depth map may be assigned a subject index 214 that identifies that pixel as imaging a particular target or non-target element. As an example, pixels corresponding to a first subject can be assigned a subject index equal to one, pixels corresponding to a second subject can be assigned a subject index equal to two, and pixels that do not correspond to a target subject can be assigned a subject index equal to zero. Such subject indices may be determined, assigned, and saved in any suitable manner without departing from the scope of this disclosure.

A tracking system and/or cooperating computing device optionally may further analyze the pixels of the depth map of a human subject in order to determine what part of that subject's body each such pixel is likely to image. A variety of different body-part assignment techniques can be used to assess which part of a human subject's body a particular pixel is likely to image. Each pixel of the depth map with an appropriate subject index may be assigned a body part index 216. The body part index may include a discrete identifier, confidence value, and/or body part probability distribution indicating the body part, or parts, to which that pixel is likely to image. Body part indices may be determined, assigned, and saved in any suitable manner without departing from the scope of this disclosure.

As one nonlimiting example, machine-learning can be used to assign each pixel a body part index and/or body part probability distribution. The machine-learning approach analyzes a human subject using information learned from a prior-trained collection of known poses. In other words, during a supervised training phase, a variety of different people are observed in a variety of different poses, and human trainers provide ground truth annotations labeling different machine-learning classifiers in the observed data. The observed data and annotations are used to generate one or more machine-learning algorithms that map inputs (e.g., observation data from a tracking system) to desired outputs (e.g., body part indices for relevant pixels).

At 218, FIG. 2 shows a schematic representation of a virtual skeleton 220 that serves as a machine-readable representation of user 104. Virtual skeleton 220 includes twenty virtual joints—{head, shoulder center, spine, hip center, right shoulder, right elbow, right wrist, right hand, left shoulder, left elbow, left wrist, left hand, right hip, right knee, right ankle, right foot, left hip, left knee, left ankle, and left foot}. This twenty joint virtual skeleton is provided as a nonlimiting example. Virtual skeletons in accordance with the present disclosure may have virtually any number of joints. In particular, as described below, a virtual skeleton may include one or more finger joints.

The various skeletal joints may correspond to actual joints of a human subject, centroids of the human subject's body parts, terminal ends of a human subject's extremities, and/or points without a direct anatomical link to the human subject. Each joint has at least three degrees of freedom (e.g., world space x/y/z). As such, each joint of the virtual skeleton is defined with a three-dimensional position. For example, a left shoulder virtual joint 222 is defined with an x coordinate position 223, a y coordinate position 224, and a z coordinate position 225. Z coordinate position 225 may encode the depth of left shoulder virtual joint 222. The position of the joints may be defined relative to any suitable origin. As one example, a tracking system may serve as the origin, and all joint positions are defined relative to the tracking system. Joints may be defined with a three-dimensional position in any suitable manner without departing from the scope of this disclosure.

A variety of techniques may be used to determine the three-dimensional position of each joint. Skeletal fitting techniques may use depth information, color information, body part information, and/or prior trained anatomical and kinetic information to deduce one or more skeleton(s) that closely model a human subject. As one nonlimiting example, the above described body part indices may be used to find a three-dimensional position of each skeletal joint.

Joint positions and/or other information may be encoded in any suitable data structure(s). Furthermore, the position and/or other parameters associated with any particular joint may be made available via one or more APIs.

Figure 3:
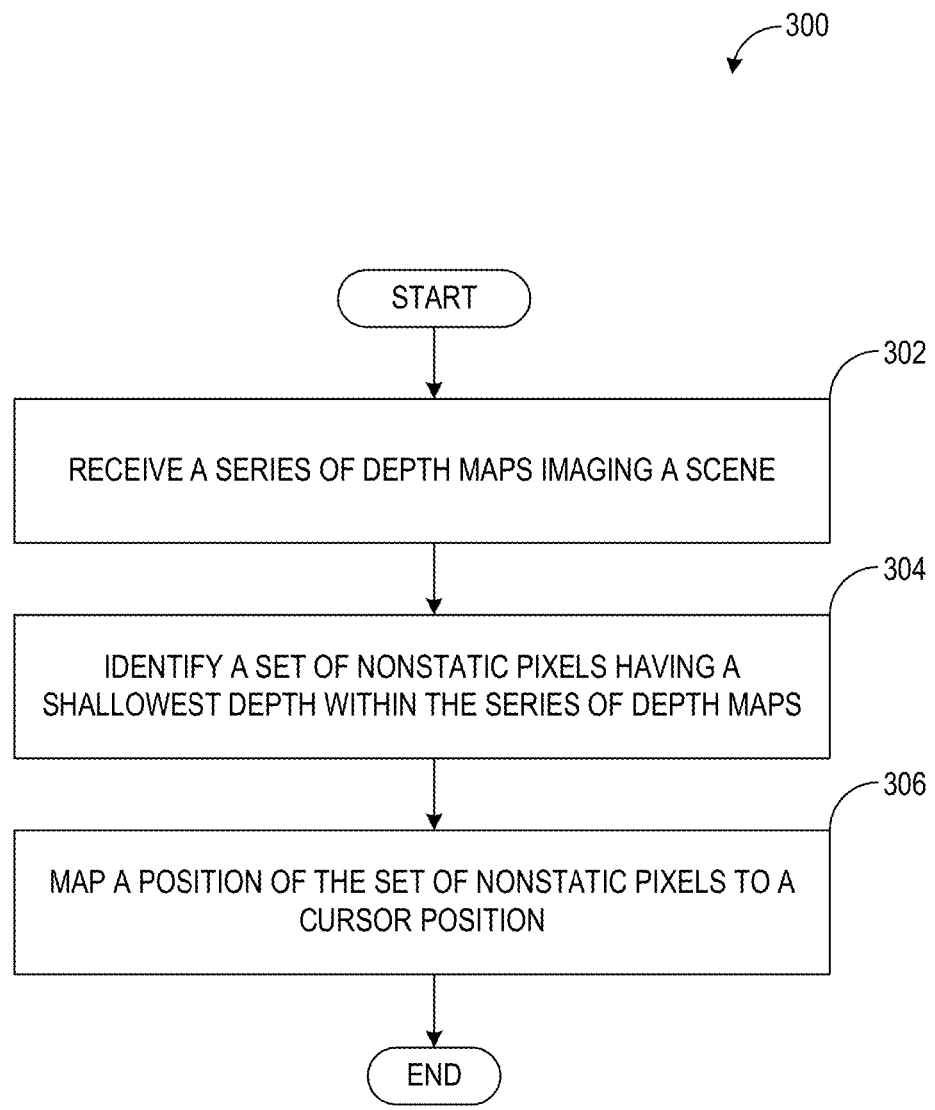
FIG. 3 shows a method of receiving touchless input in accordance with an embodiment of the present disclosure.

FIG. 3 shows a method 300 for receiving touchless input. Method 300 may be carried out, for example, by touchless input system 100. At 302, a series of depth maps are received which image a scene. The scene may include one or more human users and/or physical objects. As described above with reference to FIG. 2, each depth map in the series of depth maps includes a plurality of pixels, which each define a depth of surface imaged by that pixel.

At 304, a set of nonstatic pixels having a shallowest depth within the series of depth maps is identified. In other words, method 300 identifies one or more pixels which are substantially changing throughout the series of depth maps, and further identifies the set of one or more nonstatic pixels which are nearest a reference, such as the display or the tracking system.

Figure 4:
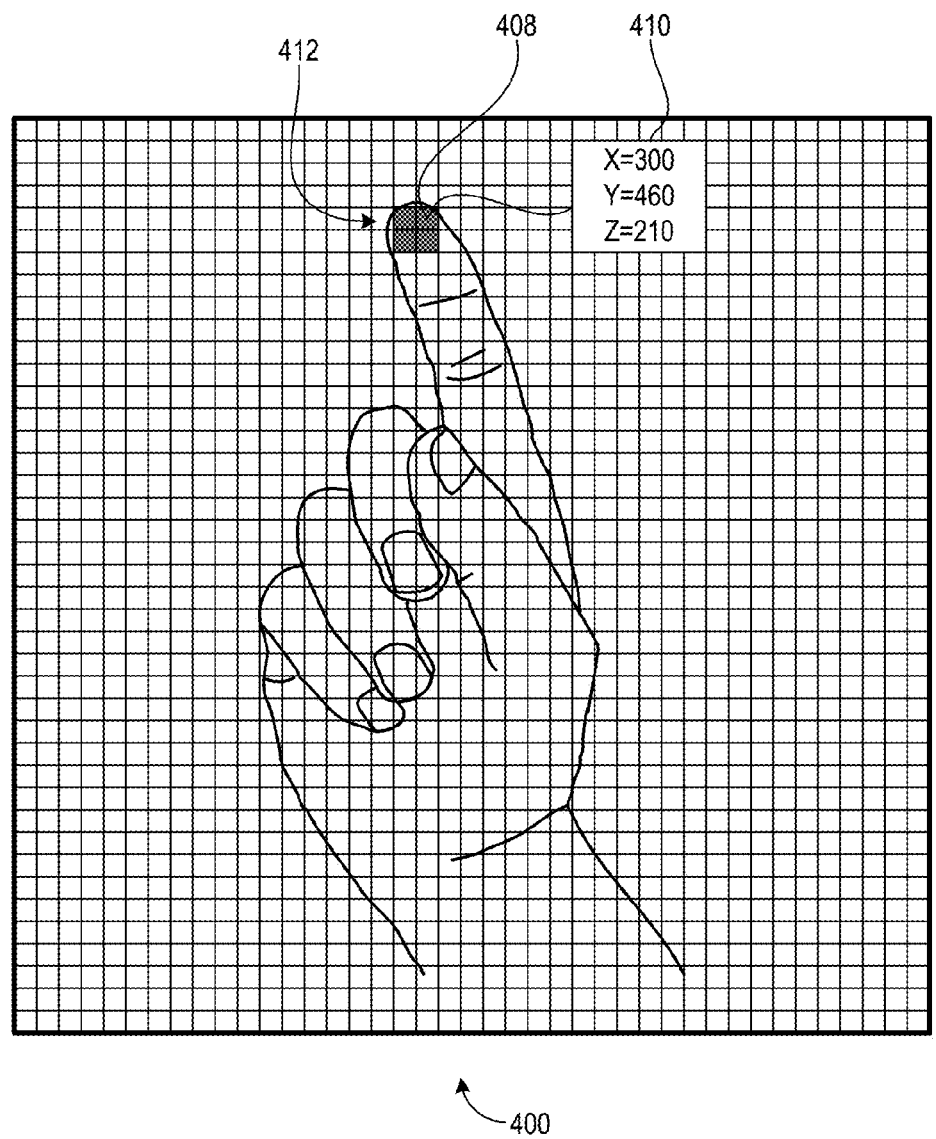
FIG. 4 schematically shows a visual representation of a depth map in accordance with an embodiment of the present disclosure.

FIG. 4 schematically shows a depth map 400. The depth map images a scene, which in this example includes a hand of user 104. The depth map includes a plurality of pixels, for example pixel 408. Pixel 408 images a surface of the index finger of user 104 and defines a depth of that surface. FIG. 4 also schematically shows the three-dimensional x/y/z coordinates 410 encoded for pixel 408. While FIG. 4 shows a single depth map, it is to be understood that depth map 400 may be one in a series of depth maps.

A nonstatic pixel in the depth map may be defined in a number of ways without departing from the scope of the present disclosure. In one example, a pixel is identified as a nonstatic pixel if its depth (e.g., z coordinate position in x/y/z coordinates) changes by at least a threshold amount (with allowances made for noise and/or other errors from the depth camera). For example, depth difference values may be defined for pixels in consecutive depth maps by subtracting the depth of the pixel in the second depth map from the depth of the same pixel in the first depth map. A threshold may be established such that if the difference value for that pixel is below the threshold, the pixel is identified as a static pixel. Conversely, if the difference value for the pixel is at or above the threshold, the pixel is identified as a nonstatic pixel. In this way, touchless input system 100 may identify nonstatic pixels corresponding to moving parts of a human subject or to a moving object (e.g., input stylus).

Other methods for identifying nonstatic pixels may be used without departing from the scope of this disclosure. For example, in some embodiments color values may also be evaluated to determine pixels that are changing color by more than a threshold amount.

Touchless input system 100 may further identify a set of nonstatic pixels having a shallowest depth in the series of depth maps. In other words, nonstatic pixels which are closest to the display or some other reference may be identified. Touchless input system 100 may first identify nonstatic pixels and subsequently identify those having the shallowest depth. Alternatively, the system may first identify pixels having the shallowest depth and subsequently identify those which are nonstatic.

Nonstatic pixels may be identified as having the shallowest depth based on a number of criteria. In one example, the nonstatic pixel with the shallowest depth in the series of depth maps is identified, assuming there are not two or more nonstatic pixels which share the same shallowest depth. In such a case, the set of nonstatic pixels includes one single pixel. Alternatively, one or more nonstatic pixels may be identified as a set of nonstatic pixels having the shallowest depth. In this example, the pixel having the smallest depth (i.e., the pixel that is closest to the display or other reference) is identified and a threshold established based on its depth. Contiguous nonstatic pixels having depths within a threshold of this depth may also be assigned to the set of nonstatic pixels having the shallowest depth. In yet another embodiment, the pixel having the shallowest depth is identified and one or more neighboring pixels may be added to the set of nonstatic pixels having the shallowest depth. In this example, the set of nonstatic pixels includes a plurality of contiguous pixels. Such a scenario is illustrated in FIG. 4, where pixel 408 is identified as having the shallowest depth. Three neighboring pixels are also included in the set of nonstatic pixels having the shallowest depth, and together the four pixels form a contiguous set 412 of nonstatic pixels.

In some embodiments, the set of nonstatic pixels imaging a particular object (e.g., finger) may be tracked throughout a consecutive number of depth maps. The particular pixels that track the object may change from one frame to the next, but heuristics may be employed to determine which set of pixels image the object in each frame. In some embodiments, a set of nonstatic pixels imaging an object will only be identified as the set of nonstatic pixels having the shallowest depth if those pixels maintain the shallowest depth for a threshold consecutive number of depth maps in a series of depth maps. In this way, inaccuracies due to noise can be avoided.

A set of nonstatic pixels may be continually tracked throughout a series of depth maps even if a new set of nonstatic pixels having the shallowest depth is identified. In this way, more than one finger and/or other object may be tracked and analyzed (e.g., to interpret multitouch gestures).

Returning to FIG. 3, at 306, method 300 includes mapping a position of the identified set of nonstatic pixels to a cursor position. Method 300, for example, may map a physical-space position of a user's finger to the position of cursor 116. In this way, the position of a pointed finger can be used to control the position of a cursor on a display device.

In some embodiments, the position of a single nonstatic pixel having the shallowest depth is mapped to the cursor position. Alternatively, an average of the positions of multiple pixels may be mapped to the cursor position.

In the illustrated embodiments, a user's finger and hand is assumed to be placed in relative proximity to the tracking system. If the tracking system and display device are housed together within the computing device, the surface imaged by a set of nonstatic pixels is a finger proximate the display device displaying a cursor at the cursor position. As one non-limiting example, a finger may be considered proximate a display device if the display device is within reach of the user.

In some strategies where the user's finger is proximate a display device, the cursor may be mapped to a cursor position that is as near to the actual finger position as possible.

Figure 5:
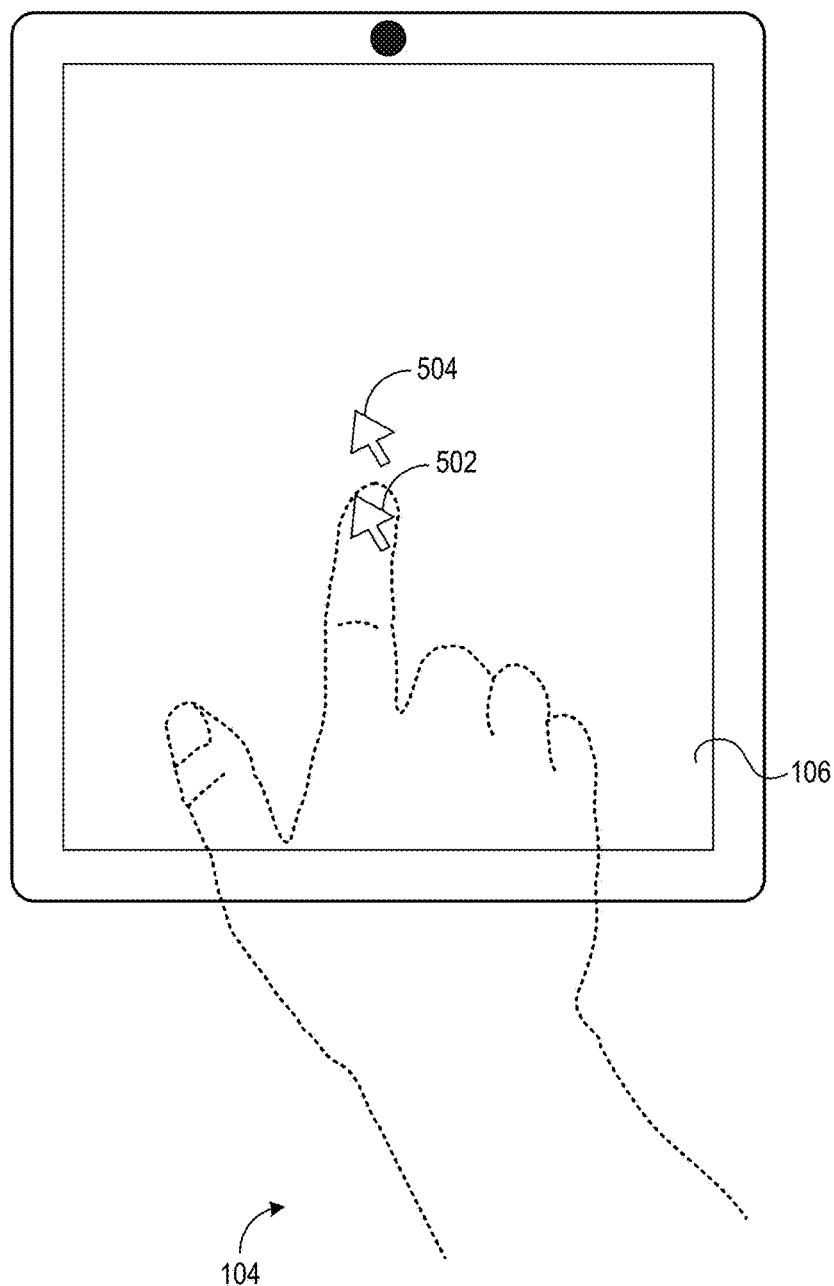
FIG. 5 shows various cursor mapping strategies in accordance with embodiments of the present disclosure.

FIG. 5 illustrates such a scenario. A hand of user 104 is shown in broken lines along with a cursor 502. However, cursor 502 is occluded from the perspective of the user.

Occlusion of cursors and other user interface elements may be mitigated by shifting the cursor position away from the finger. FIG. 5 shows a shifted cursor 504 whose position is shifted away from a physical space position of the finger of user 104.

A set of nonstatic pixels may also image a surface of a finger that is not proximate a display device displaying a cursor at the cursor position. As one non-limiting example, a finger may not be considered proximate a display device if the display device is not within a user's reach. Surfaces not proximate the display device may be imaged by an external, peripheral tracking system, for example, which may be the case if the tracking system is not housed within the computing device.

Mapping a position of a set of nonstatic pixels to a cursor position may be controlled by a mapping function. The mapping function may include a scale attribute which controls how movement of a finger and/or or input device is mapped to the cursor position. In the case where a finger is used to supply input, the scale attribute, for example, may be a sensitivity attribute, controlling the speed of cursor movement as the finger moves throughout physical space.

Figure 6:
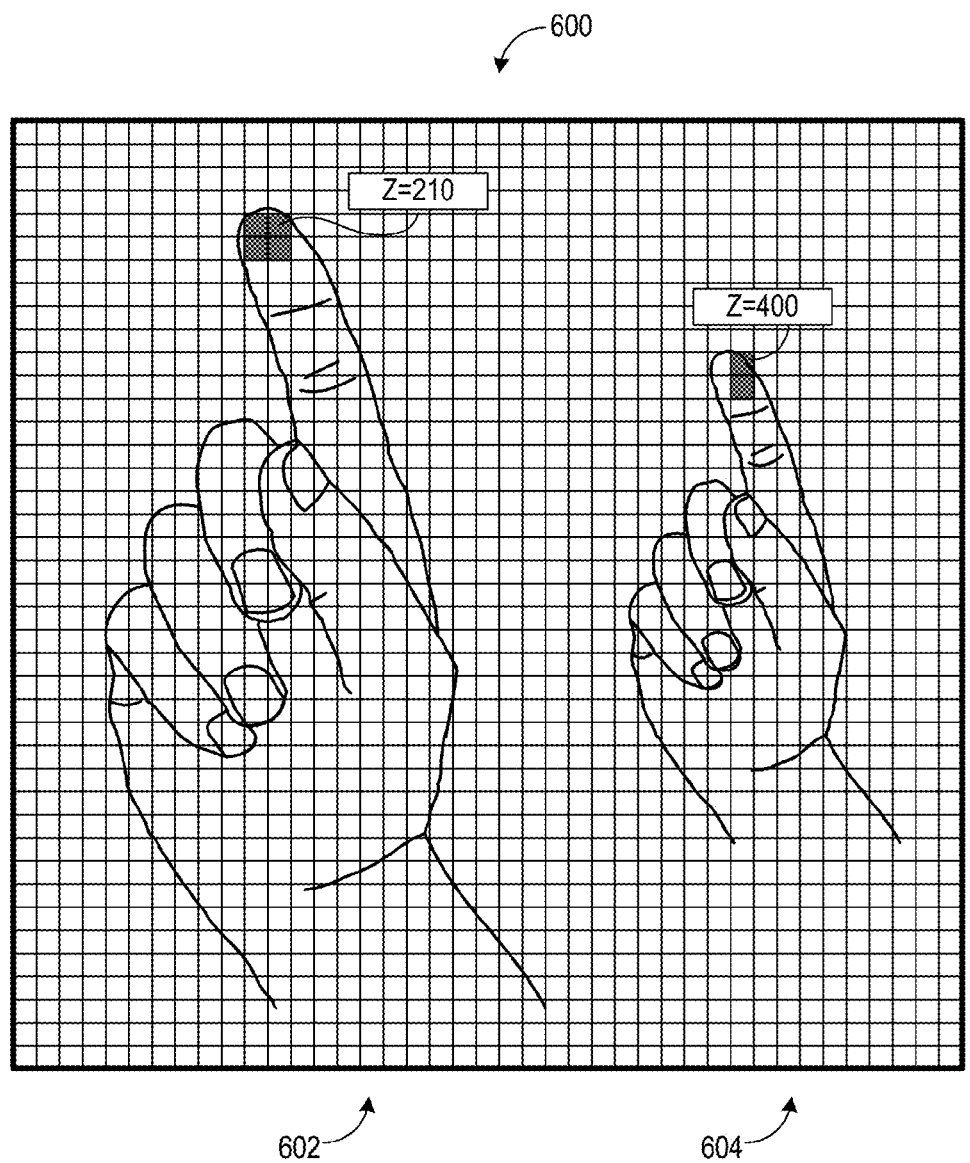
FIG. 6 schematically shows another visual representation of a depth map in accordance with an embodiment of the present disclosure.

One embodiment of a mapping function is represented in FIG. 6. A depth map 600 is schematically shown which images a scene including a first hand 602 and a second hand 604. A depth of 210 corresponding to a nonstatic pixel imaging first hand 602 is used to establish the scale of the mapping function. First hand 602 is relatively proximate the tracking system, thus the scale of the mapping function may be accordingly set high. A high scale may cause a cursor to move at a relatively fast speed as the finger moves throughout physical space. Conversely, second hand 604 is farther away from the tracking system than first hand 602 and has an associated nonstatic pixel with a depth that is accordingly higher. This nonstatic pixel may set the scale low, causing a cursor to move at a relatively slower speed as the finger moves throughout physical space. In other embodiments, the scale may be set so a finger that is farther away moves a cursor faster than a finger that is relatively closer. The depth of one or more pixels may be used to set the scale with a linear or nonlinear function.

Figure 7:
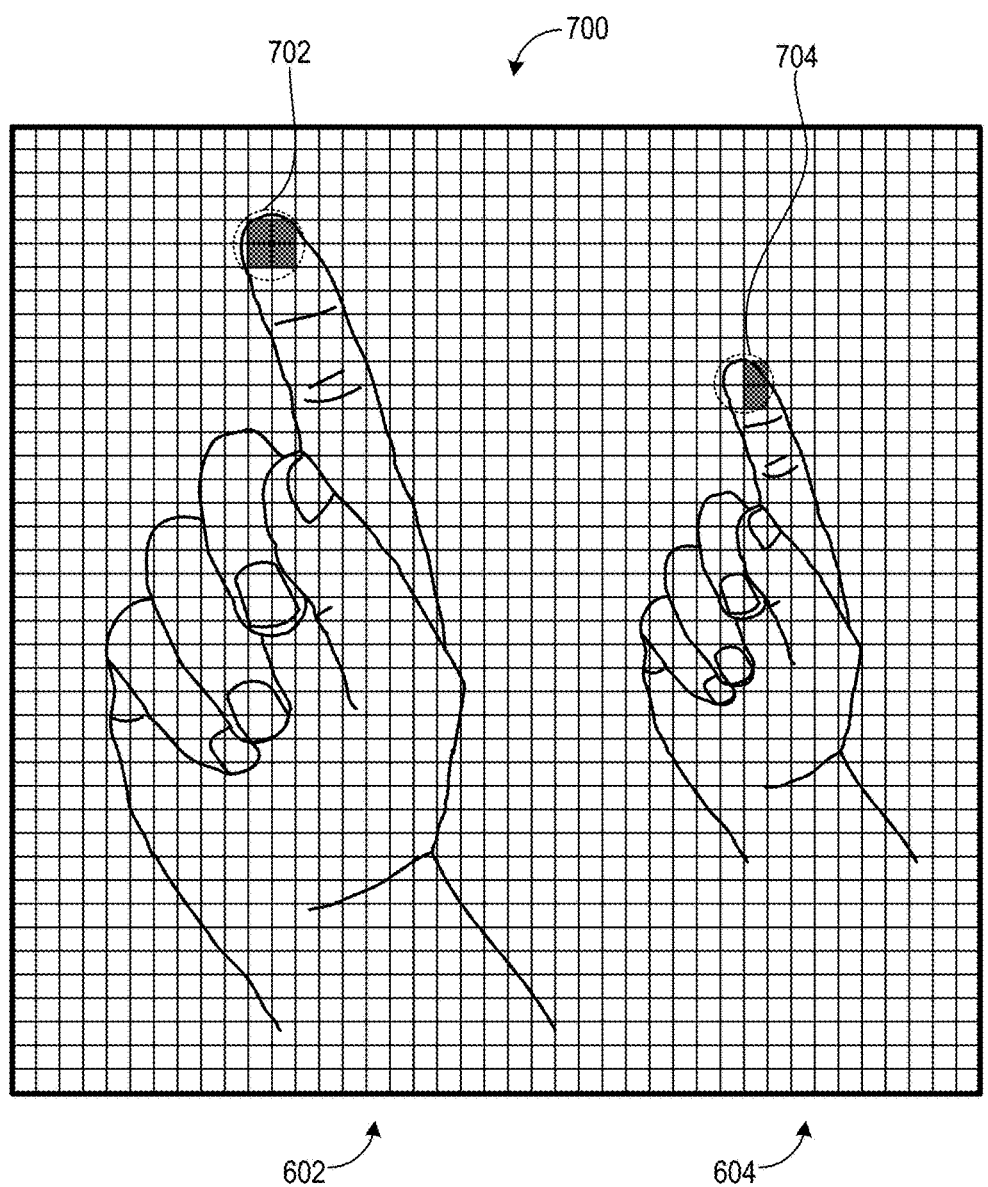
FIG. 7 schematically shows yet another visual representation of a depth map in accordance with an embodiment of the present disclosure.

FIG. 7 illustrates how the scale of a mapping function may be set based on a size of a set of nonstatic pixels. In the illustrated example, a depth map 700 is schematically shown imaging first hand 602 and second hand 604. The set of nonstatic pixels corresponding to first hand 602 comprises four pixels, while the set of nonstatic pixels corresponding to second hand 604 comprises two pixels. The mapping function may thus have a scale that changes as a function of a size of the set of nonstatic pixels. The size of a set of nonstatic pixels may be determined in virtually any manner without departing from the scope of this disclosure. As one non-limiting example, size may be determined by computing the total number of nonstatic pixels. Alternatively, size may be determined by fitting a circular aperture (e.g., apertures 702 and 704) around the perimeter of the set of nonstatic pixels and calculating its diameter.

In yet another embodiment, the scale of a mapping function may be determined based on which finger of a user's hand is identified as corresponding to the set of nonstatic pixels having the shallowest depth. For instance, touchless input system 100 may identify two or more fingers of a user and set different scales to each finger. In this way, a user may dynamically and easily control cursor sensitivity and movement by alternating usage among fingers.

Figure 8A:
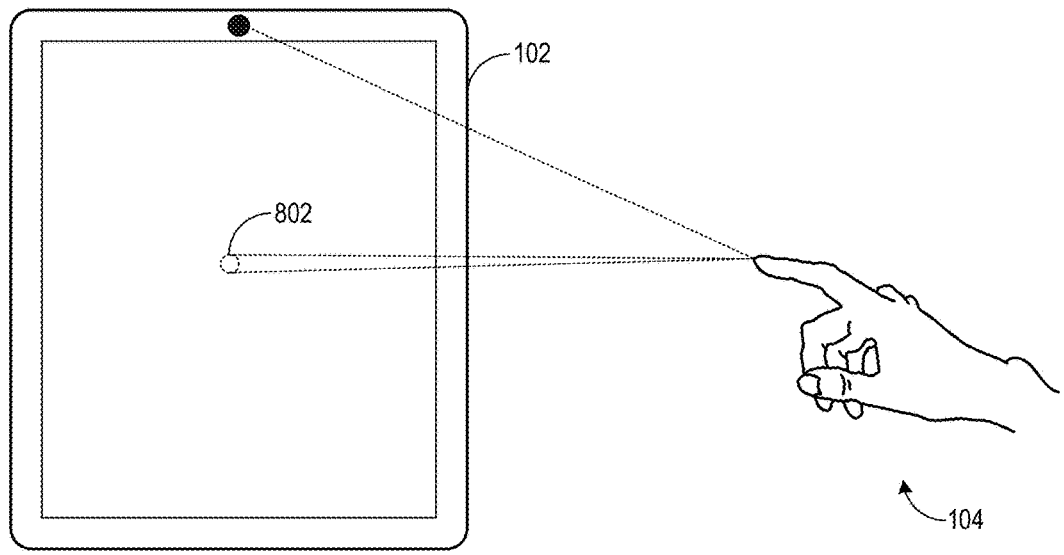
FIGS. 8A & 8B show various cursor mapping strategies in accordance with embodiments of the present disclosure.
Figure 8B:
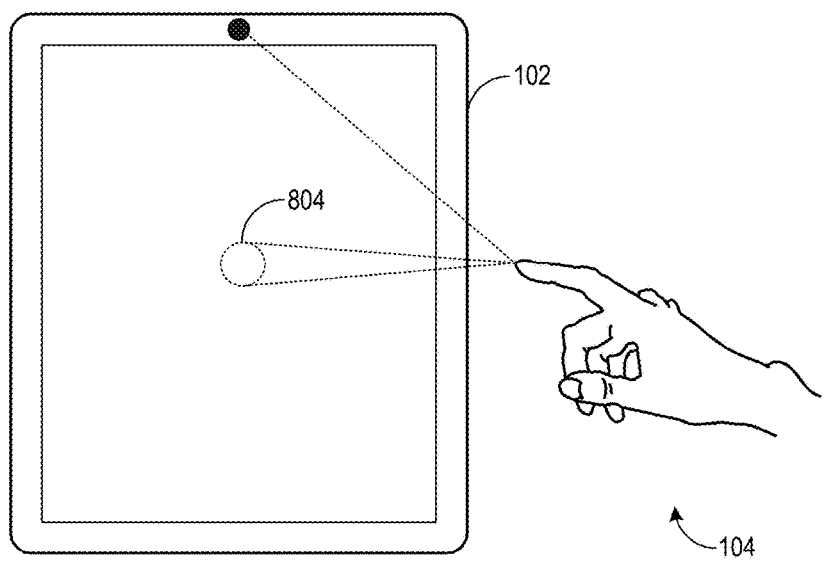

FIGS. 8A and 8B further illustrate how the scale of the mapping function may change, causing a corresponding change in the sensitivity of a cursor controlled by a user. In FIG. 8A, user 104 places a hand relatively far away from computing device 102. The scale of the mapping function is accordingly set low, making cursor movement slow and precise. This low scale is represented by aperture 802, which has a relatively small diameter. In FIG. 8B, user 104 has moved the hand relatively close to computing device 102. The scale of the mapping function is accordingly set high, making cursor movement fast. This high scale is represented by aperture 804, which has a relatively large diameter. In this way, users may seamlessly transition throughout a continuum of cursor sensitivities. While the example scaling is provided as an example, it is to be understood that virtually any scaling function may be used without departing from the scope of this disclosure. For example, a scaling function that causes a cursor to move faster when a finger is farther away may be used.

Touchless input system 100 may control computing aspects other than cursor position and sensitivity. By tracking a set of nonstatic pixels throughout a consecutive number of depth maps as described above, one or more parameters (e.g., depth) associated with the tracked set of pixels may be evaluated and mapped to virtually any cursor operation. The parameters may include a three-dimensional path (e.g., x/y/z coordinates) of the tracked set of pixels. Cursor operations may include a click operation, a double-click operation, a triple-click operation, a select operation, a highlight operation, a scroll operation, and a drag operation. However, these operations are merely provided as illustrative examples and are not intended to be limiting in any way. Virtually any cursor operation may be interpreted and carried out with the methods described herein.

Figure 9:
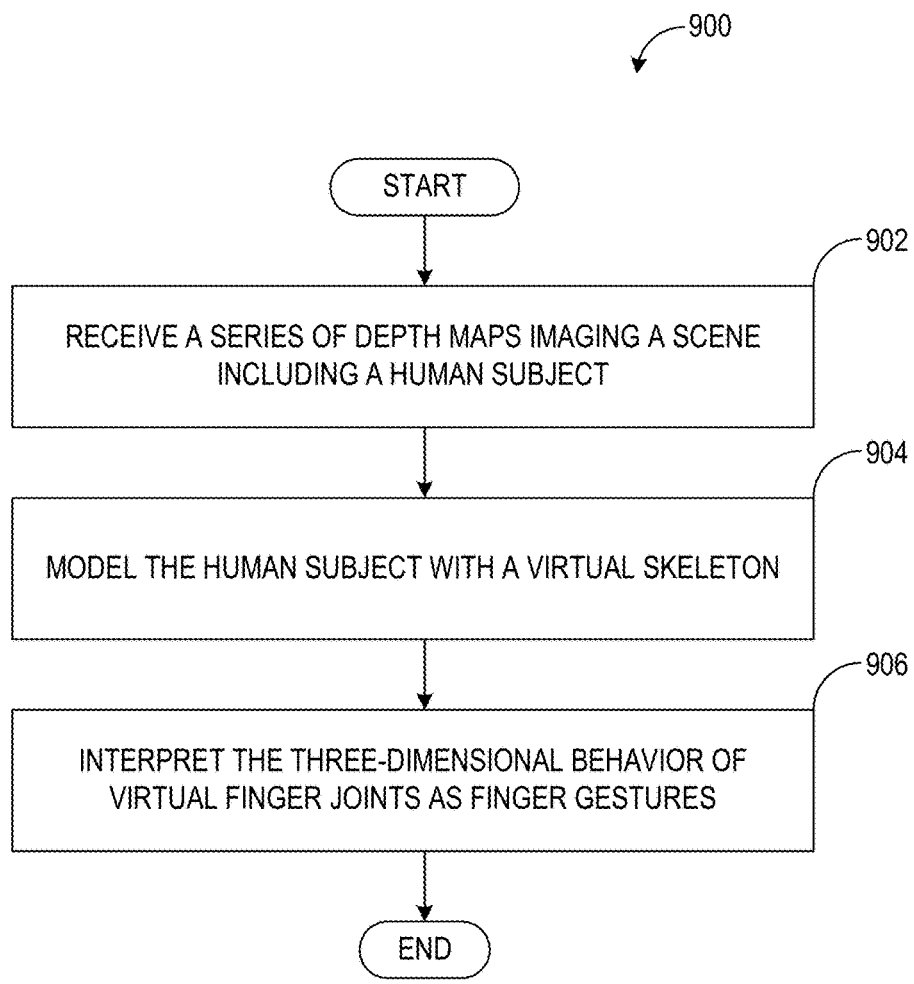
FIG. 9 shows another method of receiving touchless input in accordance with an embodiment of the present disclosure.

FIG. 9 shows a method 900 for receiving touchless input. Method 900 may be carried out, for example, by touchless input system 100. At 902, a series of depth maps are received from a depth camera, as described above with reference to FIG. 2. The series of depth maps image a scene including a human subject.

At 904, the human subject is modeled with a virtual skeleton which includes a plurality of virtual finger joints in accordance with the embodiments described above, particularly with reference to FIG. 2.

Figure 10:
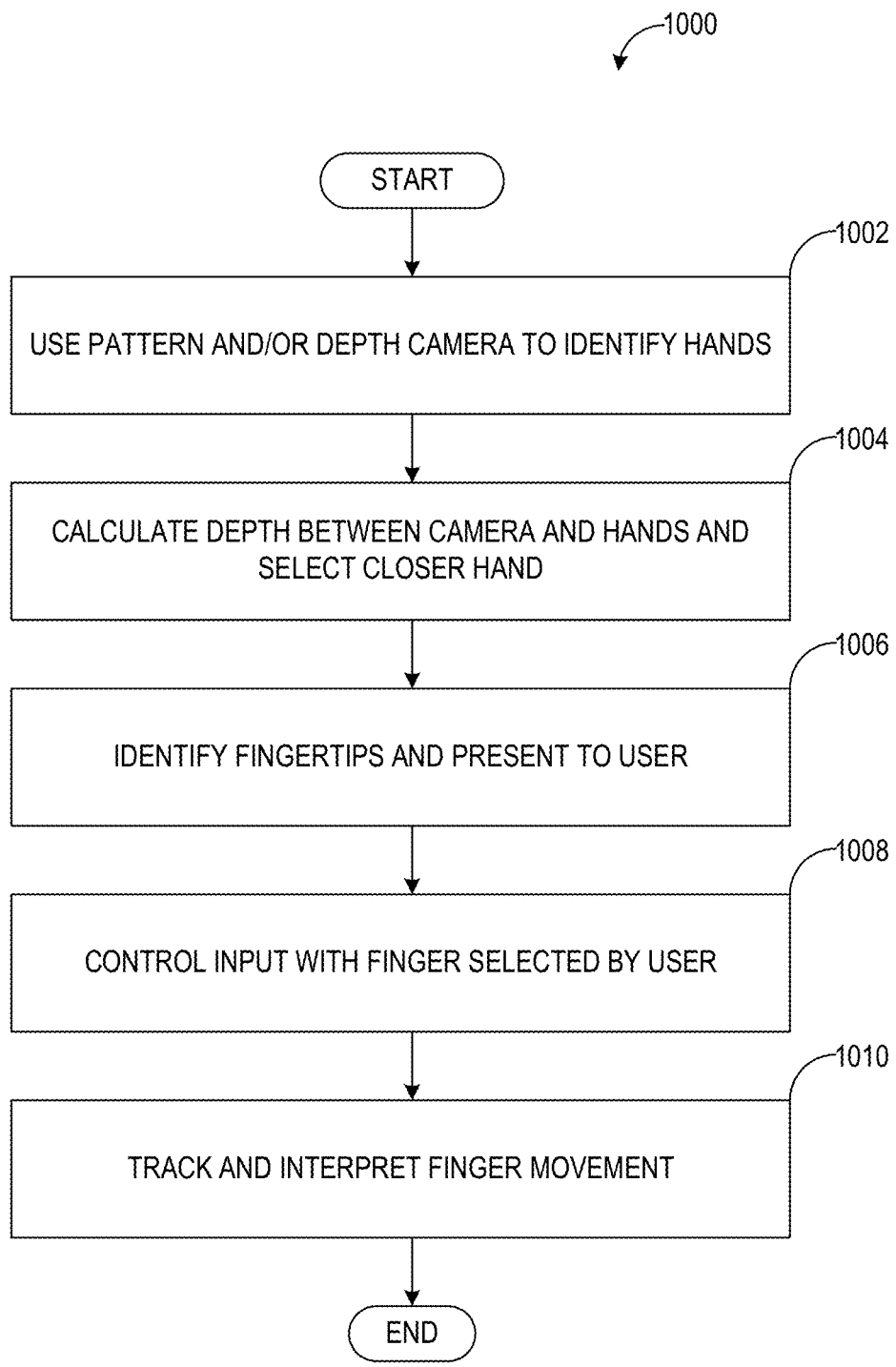
FIG. 10 shows a method of modeling fingers in accordance with an embodiment of the present disclosure.

In some embodiments, virtual finger joints may be modeled with a previously trained machine learning algorithm. Alternatively, a method 1000 shown in FIG. 10 may be employed to model the virtual finger joints. At 1002, a depth camera provided internally or externally to the computing device is used to identify the hands of a user. The hands may be identified using any suitable method, including pipeline 200, without departing from the scope of this disclosure. At 1004, the computing device calculates the depth between the tracking system and both identified hands, selecting the closer hand for input. At 1006, the computing device identifies each fingertip of the identified hand and optionally presents representations of the identified fingers to the user via a display screen. At 1008, the computing device receives a selection from the user indicating which finger is to control input. At 1010, the computing device tracks the finger in three-dimensional space and interprets its movement as gestures.

Fingers may also be modeled by fitting a substantially linear profile to pixels corresponding to the one or more fingers. In other words, fingers may be approximated by a stick-like geometry. A finger angle between the fingertips and the tracking system may then be calculated based on the fitted linear profiles. In this way, both the length and tip of fingers may be accurately modeled and tracked.

In embodiments in which the depth camera has sufficient resolution, fingerprints of a human subject may be identified and matched to a user. In this way, the user can be identified and cursor control or other computing attributes may be set to preferences associated with the identified user.

Returning to FIG. 9, at 906 the three-dimensional behavior of one or more virtual finger joints modeled from one or more depth maps is interpreted as a finger gesture. Interpretation of the three-dimensional behavior may include evaluating the x/y/z coordinates of one or more virtual finger joints. Interpretation may further include tracking the virtual finger joint throughout a consecutive number of depth maps as described above.

Virtually any finger or multitouch gesture may be interpreted without departing from the scope of this disclosure. While "multitouch" is used herein to describe finger gestures that utilize more than one finger, it is to be understood that the present disclosure enables such gestures to be performed in a touchless manner. Examples of such touchless multitouch gestures include a tap gesture, a double-tap gesture, a press gesture, a scroll gesture, a pan gesture, a flick gesture, a two finger tap gesture, a two finger scroll gesture, a pinch gesture, a spread gesture, and a rotate gesture. However, it will be appreciated that these examples are merely illustrative and are not intended to be limiting in any way.

Finger gestures may further be interpreted based on a selection previously made by a human subject. The human subject, for example, may instruct touchless input system 100 to ignore input from the ring and pinkie fingers, limiting interpretation of finger gestures to the index and middle fingers.

Figure 11:
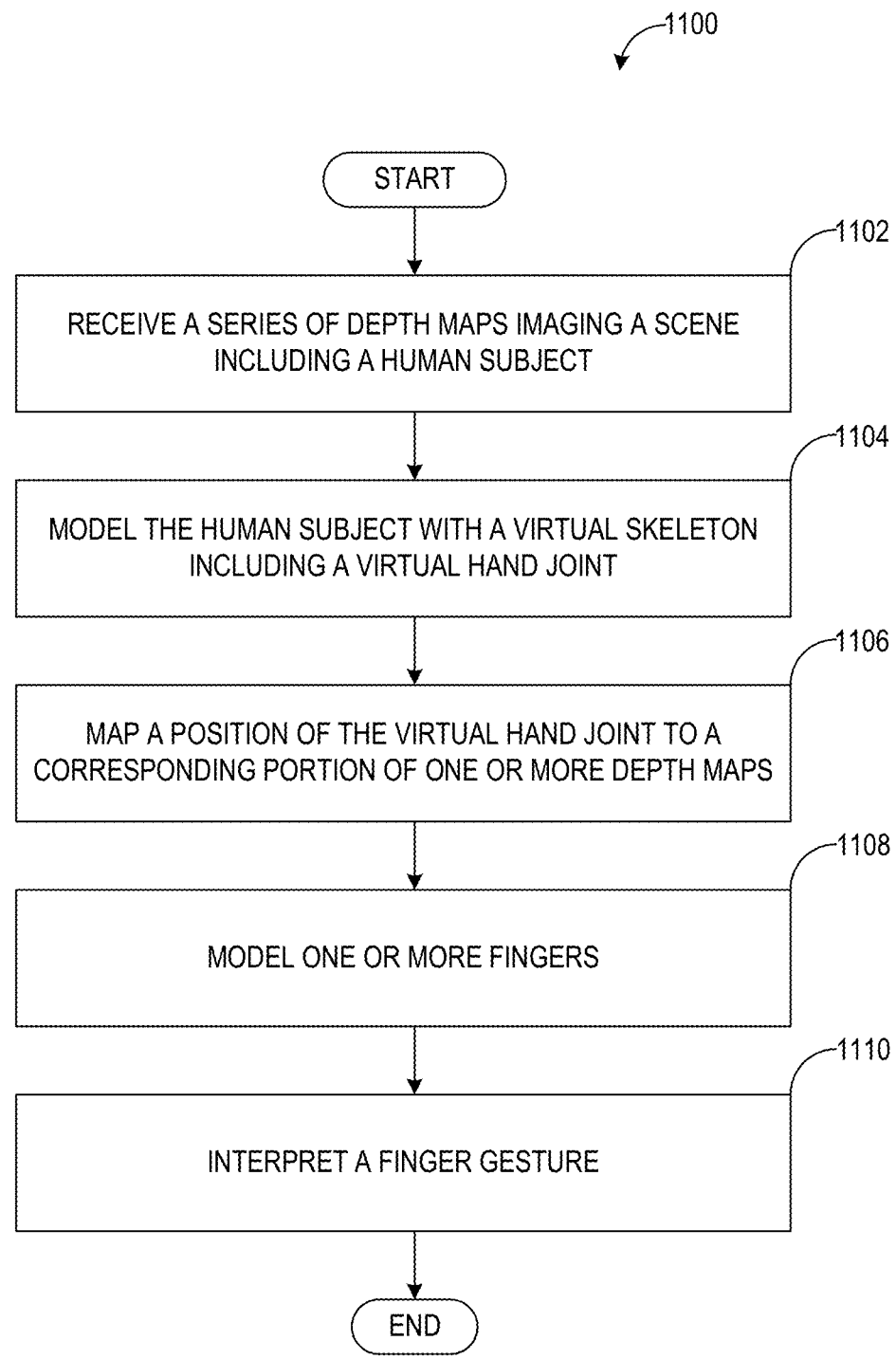
FIG. 11 shows another method of receiving touchless input in accordance with an embodiment of the present disclosure.

FIG. 11 shows another method 1100 for receiving touchless input. Method 1100 may be carried out, for example, by touchless input system 100. At 1102, a series of depth maps are received from a depth camera, as described above with reference to FIG. 2.

At 1104, a human subject is modeled with a virtual skeleton including a virtual hand joint, as described above particularly with reference to FIG. 2.

At 1106, a position of the virtual hand joint is mapped to a corresponding portion of one or more depth maps in the series of depth maps. The corresponding portion images a hand of the human subject, the hand also being modeled by the virtual hand joint.

At 1108, one or more fingers of the human subject are modeled. In particular, once the portion of the depth map that images the hand is identified by virtue of the virtual hand joint of the virtual skeleton, that portion of the depth map may be analyzed to more accurately model the imaged hand and fingers. Any suitable techniques may be used to model the hand and fingers in this way. As a nonlimiting example, a prior trained machine learning algorithm may model the hand in a machine readable form from which finger gestures may be tracked. As another example, method 1000 of FIG. 10 may be used.

At 1110, finger gestures performed by the one or more fingers are interpreted. The interpretation may be carried out as described above. In some embodiments, a "finger gesture" may refer to a gesture performed by a physical object that is held or otherwise associated with one or more of the modeled fingers. As such, interpreting a finger gesture, as described herein, may include interpreting a gesture of a physical object that is held or otherwise associated with one or more of the modeled fingers.

Method 1100 may afford an increase in the responsiveness of modeling fingers, as, once a virtual hand joint is identified, other portions of a depth map not corresponding to the virtual hand joint need not be processed and analyzed.

It is to be understood that the above methods are not intended to be limiting. Touchless input may be received and interpreted with a variety of different methods without departing from the scope of this disclosure.

In some embodiments, the methods and processes described above may be tied to a computing device of one or more computing devices. In particular, such methods and processes may be implemented as a computer-application program or service, an application-programming interface (API), a library, and/or other computer-program product.

Figure 12:
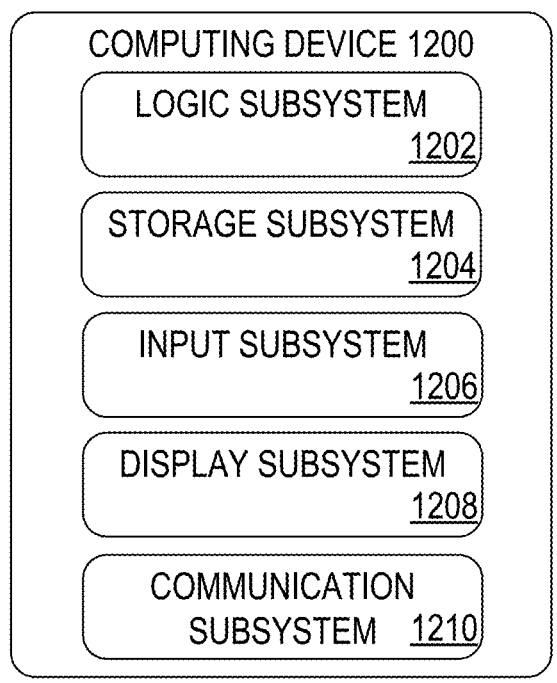
FIG. 12 shows a computing device in accordance with an embodiment of the present disclosure.

FIG. 12 schematically shows a non-limiting embodiment of a computing device 1200 that can enact one or more of the methods and processes described above. Computing device 1200 is shown in simplified form. It will be understood that virtually any computer architecture may be used without departing from the scope of this disclosure. In different embodiments, computing device 1200 may take the form of a mainframe computer, server computer, desktop computer, laptop computer, tablet computer, home-entertainment computer, network computing device, gaming device, mobile computing device, mobile communication device (e.g., smart phone), etc.

Computing device 1200 includes a logic subsystem 1202 and a storage subsystem 1204. Computing device 1200 may optionally include an input subsystem 1206, display subsystem 1208, communication subsystem 1210, and/or other components not shown in FIG. 12.

Logic subsystem 1202 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 1204 includes one or more physical, non-transitory, devices configured to hold data and/or instructions executable by the logic subsystem to implement the methods and processes described herein. When such methods and processes are implemented, the state of storage subsystem 1204 may be transformed—e.g., to hold different data.

Storage subsystem 1204 may include removable media and/or built-in devices. Storage subsystem 1204 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 1204 may include volatile, nonvolatile, dynamic, static, read/write, read-only, random-access, sequential-access, location-addressable, file-addressable, and/or content-addressable devices.

It will be appreciated that storage subsystem 1204 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

In some embodiments, aspects of logic subsystem 1202 and of storage subsystem 1204 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module," "program," and "engine" may be used to describe an aspect of computing device 1200 implemented to perform a particular function. In some cases, a module, program, or engine may be instantiated via logic subsystem 1202 executing instructions held by storage subsystem 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1208 may be used to present a visual representation of data held by storage subsystem 1204. This visual representation may take the form of a graphical user interface (GUI). As the herein described methods and processes change the data held by the storage subsystem, and thus transform the state of the storage subsystem, the state of display subsystem 1208 may likewise be transformed to visually represent changes in the underlying data. Display subsystem 1208 may include one or more display devices utilizing virtually any type of technology. Such display devices may be combined with logic subsystem 1202 and/or storage subsystem 1204 in a shared enclosure, or such display devices may be peripheral display devices.

When included, input subsystem 1206 may comprise or interface with one or more user-input devices such as a keyboard, mouse, touch screen, or game controller. In some embodiments, the input subsystem may comprise or interface with selected natural user input (NUI) componentry (e.g., tracking system 108). Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

In some embodiments, input subsystem 1206 may comprise or interface with a "structured light" depth camera, which may be configured to project a structured infrared illumination comprising numerous, discrete features (e.g., lines or dots). A camera may be configured to image the structured illumination reflected from the scene. Based on the spacings between adjacent features in the various regions of the imaged scene, a depth map of the scene may be constructed.

Input subsystem 1206 may comprise or interface with a "time-of-flight" depth camera, which may include a light source configured to project a pulsed infrared illumination onto a scene. Two cameras may be configured to detect the pulsed illumination reflected from the scene. The cameras may include an electronic shutter synchronized to the pulsed illumination, but the integration times for the cameras may differ, such that a pixel-resolved time-of-flight of the pulsed illumination, from the light source to the scene and then to the cameras, is discernible from the relative amounts of light received in corresponding pixels of the two cameras.

When included, communication subsystem 1210 may be configured to communicatively couple computing device 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing device 1200 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method, comprising:
receiving from a depth camera a series of depth maps imaging a scene including a human subject, each depth map including a plurality of pixels, each of the plurality of pixels defining a depth of a surface imaged by that pixel;
modeling the human subject with a virtual skeleton including a plurality of virtual joints including a virtual hand joint and one or more other virtual joints;
mapping a position of the virtual hand joint to a corresponding portion of one or more depth maps in the series of depth maps, the corresponding portion of the one or more depth maps imaging a hand of the human subject modeled by the virtual hand joint and excluding other portions of the human subject modeled by the one or more other virtual joints;
performing analysis on depth map information of the corresponding portion of one or more depth maps to model one or more fingers of the hand without performing analysis on depth map information of other portions of the one or more depth maps corresponding to the other portions of the human subject modeled by the one or more other virtual joints; and
interpreting a finger gesture performed by the one or more fingers.

2. The method of claim 1, where the one or more fingers are modeled using a previously trained machine learning algorithm.

3. The method of claim 1, where modeling the one or more fingers further includes:
fitting a substantially linear profile to pixels corresponding to the one or more fingers; and
calculating a finger angle from the linear profile.

4. The method of claim 1, where the finger gesture is interpreted based on a selection previously made by the human subject.

5. The method of claim 1, where modeling the one or more fingers further includes modeling one or more fingerprints of the human subject.

6. The method of claim 1, where the finger gesture includes a tap gesture.

7. The method of claim 1, where the finger gesture includes a double-tap gesture.

8. The method of claim 1, where the finger gesture includes a press gesture.

9. The method of claim 1, where the finger gesture includes a scroll gesture.

10. The method of claim 1, where the finger gesture includes a pan gesture.

11. The method of claim 1, where the finger gesture includes a flick gesture.

12. The method of claim 1, where the finger gesture includes a two finger tap gesture.

13. The method of claim 1, where the finger gesture includes a two finger scroll gesture.

14. The method of claim 1, where the finger gesture includes a pinch gesture.

15. The method of claim 1, where the finger gesture includes a rotate gesture.

16. The method of claim 1, wherein the one or more other virtual joints include one or more of a head joint, shoulder center joint, spine joint, hip center joint, right shoulder joint, right elbow joint, right wrist joint, left shoulder joint, left elbow joint, left wrist joint, right hip joint, right knee joint, right ankle joint, right foot joint, left hip joint, left knee joint, left ankle joint, and left foot joint.

17. A computer, comprising:
a logic machine configured to execute instructions; and
a storage machine holding instructions executable by the logic machine, the instructions including:
instructions to receive from a depth camera a series of depth maps imaging a scene including a human subject, each depth map including a plurality of pixels, each of the plurality of pixels defining a depth of a surface imaged by that pixel;
instructions to model the human subject with a virtual skeleton including a plurality of virtual joints including a virtual hand joint and one or more other virtual joints;
instructions to map a position of the virtual hand joint to a corresponding portion of one or more depth maps in the series of depth maps, the corresponding portion of the one or more depth maps imaging a hand of the human subject modeled by the virtual hand joint and excluding other portions of the human subject modeled by the one or more other virtual joints;
instructions to perform analysis on depth map information of the corresponding portion of one or more depth maps to model one or more fingers of the hand without performing analysis on depth map information of other portions of the one or more depth maps corresponding to the other portions of the human subject modeled by the one or more other virtual joints; and
instructions to interpret a finger gesture performed by the one or more fingers.

18. The computer of claim 17, where the instructions to model one or more fingers include a previously trained machine learning algorithm.

19. The computer of claim 17, where the instructions to interpret the finger gesture are configured to interpret the finger gesture based on a selection previously made by the human subject.

20. A method, comprising:
receiving from a depth camera a series of depth maps imaging a scene including a human subject, each depth map including a plurality of pixels, each of the plurality of pixels defining a depth of a surface imaged by that pixel;
modeling the human subject with a virtual skeleton including a plurality of virtual joints including a virtual hand joint and one or more other virtual joints;
after a position of the virtual hand joint is determined, performing analysis on a subset of pixels selected from the plurality of pixels and corresponding to the virtual hand joint to model a plurality of virtual finger joints without performing analysis on pixels not included in the subset; and
interpreting the three-dimensional behavior of one or more virtual finger joints as a finger gesture.

* * * * *